(12) United States Patent
Bosco et al.

(10) Patent No.: US 7,032,203 B1
(45) Date of Patent: Apr. 18, 2006

(54) ALGORITHM TO INCREASE LOGIC INPUT WIDTH BY CASCADING PRODUCT TERMS

(75) Inventors: Gilles Bosco, San Jose, CA (US); Hua Xue, Sunnyvale, CA (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 444 days.

(21) Appl. No.: 10/620,147

(22) Filed: Jul. 14, 2003

(51) Int. Cl.
*G06F 9/45* (2006.01)

(52) U.S. Cl. ............................... 716/7; 716/12; 716/16
(58) Field of Classification Search .................... 716/7, 716/12, 16
See application file for complete search history.

(56) References Cited

U.S. PATENT DOCUMENTS 5,128,871 A * 7/1992 Schmitz ....................... 716/17
5,357,153 A * 10/1994 Chiang et al. ................. 326/40
5,969,539 A * 10/1999 Veytsman et al. ............. 326/39
6,653,860 B1 * 11/2003 Agrawal et al. ............... 326/41

* cited by examiner

*Primary Examiner*—Vuthe Siek
*Assistant Examiner*—Brandon Bowers
(74) *Attorney, Agent, or Firm*—Jonathan W. Hallman; MacPherson Kwok Chen & Heid

(57) ABSTRACT

An algorithm is disclosed to partition input variables between a feeder logic block and a receiver logic block. For a given input variable partition, the algorithm assigns both a cost to the number of product terms cascaded from the feeder logic block to the receiver logic block as well as a cost that increases as the number of input variables assigned to the receiver logic block approaches its maximum input width. The costs for a variety of input variable partitions are tested to determine an optimal input variable partition.

14 Claims, 3 Drawing Sheets

ALGORITHM TO INCREASE LOGIC INPUT WIDTH BY CASCADING PRODUCT TERMS

TECHNICAL FIELD

The present invention relates generally to programmable logic devices. More specifically, the present invention relates to an algorithm for the fitting of logical inputs between logic blocks of a programmable logic device configured to cascade product terms between the logic blocks to implement wider-input logic functions.

BACKGROUND

Programmable logic devices, such as a complex programmable logic device (CPLD), typically include a number of independent logic blocks interconnected by a global or centralized routing structure. For example, FIG. 1 illustrates a block diagram of a conventional CPLD 10 that includes a routing structure 100 and sixteen logic blocks 102, with each logic block 102 having 16 macrocells (not illustrated) and receiving 36 inputs from routing structure 100. Each logic block 102 in CPLD 10 includes a programmable AND array (not illustrated) that a user configures to provide product term outputs of the true and complement form of the logical inputs received from routing structure 100. The product terms may be summed and the resulting sum of product terms registered in the macrocells within each logic block 102. The number of logical inputs that may factor into each product term is referred to as the "input width" for a given logic block and is fixed by the routing structure configuration. With respect to FIG. 1, the input width for logic blocks 102 is thirty-six. Another metric for a logic block is its logic depth, which is determined by the number of product terms that may be summed and registered within each macrocell.

Users often require relatively wide input logic blocks providing a high density of macrocells to implement complex functions such as decoders. However, as just described, conventional CPLD logic blocks are implemented with a fixed input width such that users may achieve a higher input width only by cascading product terms through the routing structure. However, this cascading through the 10, routing structure introduces routing delays and limits the maximum-achievable input width. To provide enhanced product term cascading, U.S. Ser. No. 10/133,016 describes a programmable device wherein product terms may be directly cascaded from one logic block to another to increase the input width without passing through the routing structure. A high-level block diagram for two logic blocks within such a programmable device 200 is shown in FIG. 2.

Logic blocks within programmable device 200 may be organized into feeder logic blocks 205 and receiver logic blocks 210. In the exemplary embodiment shown in FIG. 2, each logic block 205 and 210 receives 68 input signals from a routing structure 220. Each logic block 205 and 210 contains the same number of product term circuits 230 and thus each has the same number of product term outputs. Ten product term outputs pt_f0 through pt_f9 and pt_r0 through pt_r9 are shown for logic block 205 and 210, respectively. Each logic block 205 and 210 contains macrocells (not illustrated) for registering sums of the product term outputs. In the embodiment illustrated, each macrocell may register the sum of five product term outputs. Thus, the product term outputs may be organized according to which macrocell they correspond to. For example, product term outputs pt_f0 through pt_f4 may be summed at macrocell 0 in feeder logic block 205. For illustration clarity, additional product term outputs (and their corresponding product term circuits and macrocells) for each logic block are not shown.

To facilitate product term cascading, receiver logic block includes a plurality of AND gates 240 corresponding on a one-to-one basis with the plurality of product term outputs. For example, one AND gate 240 receives pt_r0 and pt_f0, another AND gate 240 receives pt_r1 and pt_f1, and so on. Each AND gate 240 is configured to always receive the corresponding product term output from receiver logic block 210. However, the product term outputs from feeder logic block 205 are selectively fused into AND gates 240 through the activation of fuse points 250. If a fuse point is not activated, the corresponding input for AND gate 240 is tied to a "true" logic level. Because the AND of a true value with another input will depend solely upon the logical state of the other input, an output 260 of an AND gate 240 will simply reflect the value of the corresponding receiver logic block product term output if its fuse point 250 is not activated. If, however, a fuse point 250 is activated, output 260 will be the AND (or logical product) of both the corresponding receiver and feeder logic block product term outputs. Note the advantages provided by such a product term cascading. Because the feeder block product term output is not cascaded through routing structure 220, a logical input for receiver logic block 210 need not be occupied by the cascaded product term. Moreover, the routing delay and routing burden associated with cascading through routing structure 220 is avoided.

Despite the advantages provided by the product term cascading approach discussed with respect to FIG. 2, issues arise with respect to the assignment of input variables between feeder logic block 205 and receiver logic block 210. Each AND gate output 260 is a product term having a maximum width of twice whatever the routing-structure-defined-maximum input width is for each cascaded product term. In the embodiment illustrated in FIG. 2, this routing-structure-limited input width is 68 logical input variables. Suppose a user's design requires a product term having an input width of 100 logical variables. Because this width exceeds the maximum number of logical variables (68) that can be provided by the routing structure 220 to any one logical block, product term cascading is required. In such a case, however, an assignment choice must be made between feeder logic block 205 and receiver logic block 210. In other words, the 100 input variables must be split between receiver logic block 210 and feeder logic block 205. This split may be better understood with the following example: Let f be a logic function in a sum of n products term form, where each product term may have a width of k inputs, k being larger than the routing-structure-limited input width for each logic block. Thus, the function f may be represented by the equation f=pt0+pt1+ . . . +ptn. Splitting the inputs for each product term in this function may be illustrated by reformulating the function as f=(pt_r0*pt_f0)+(pt_r1*pt_f1)+ . . . +(pt_rn*pt_fn), where pt_ri are the product term outputs of receiver logic block 210 and pt_fi are the product term outputs of the feeder logic block 210 as discussed with respect to FIG. 2. Note that any given product term pt_fi or pt_ri may be held constant to "true" or logical one if it supplies no input variables. If a product term output from receiver logic block 210 supplies no input variables, it is effectively wasted. However, the number of product term outputs required from receiver logic block 210 to form function f is determined by the integer number n and cannot be changed. Thus, one approach to prevent the wastage of product term outputs in receiver logic block 210 is to assign the maximum number of logical inputs (as defined by the routing structure limitations) to receiver logic block 210 and minimize the number assigned to feeder logic block 205. For example, with respect to the embodiment shown in FIG. 2, if function f has a width k of 70 input variables, this approach would apportion 68 input variables to receiver logic block 210 and only 2 to feeder logic block 205. While such an approach prevents the wastage of product terms, it leads to routing burdens in that routing structure 210 must then provide for its maximum allowable number of inputs to receiver logic block 210.

In sum, although the direct width cascading discussed with respect to FIG. 2 allows a receiver logic block to borrow inputs from a feeder logic block to thereby achieve greater product term input width, the associated product term cascading may lead to wastage of product terms or routing structure burdens. Accordingly, there is a need in the art for an efficient approach to partition inputs between logic blocks providing product term cascading to increase input width.

SUMMARY

One aspect of the invention relates to a method for assigning input variables between a feeder logic block and a receiver logic block to implement a logic function, wherein the input width of the logic function exceeds the maximum input width for both the feeder logic block and the receiver logic block. The method includes an act of providing a cost function that assigns a cost to the number of product terms cascaded from the feeder logic block to the receiver logic block and also assigns a cost that increases as the number of input variables assigned to the receiver logic block approaches its maximum input width. Another act comprises testing the cost function using a plurality of input variable assignments to determine an optimal input variable assignment.

Another aspect of the invention relates to a method for partitioning a plurality of logic functions amongst segments of a programmable logic device, wherein each segment comprises a plurality of logic blocks arranged from a first logic block to a last logic block, the plurality of logic blocks being configured to support a cascade chain extending from the first logic block to the last logic block for increasing the input width of cascaded product terms, and wherein each logic block has a maximum input width. The method includes the acts of: identifying functions within the logic functions whose input width exceeds the maximum input width for the logic blocks; providing a cost function that assigns a first cost to the number of outputs provided to a segment by the remaining segments and that assigns a second cost to the number of identified functions within each segment; and testing the cost function with a plurality of partitions of the logic functions to identify an optimal partitioning.

BRIEF DESCRIPTION OF THE DRAWINGS

Use of the same reference symbols in different figures indicates similar or identical items.

DETAILED DESCRIPTION

Figure 3:
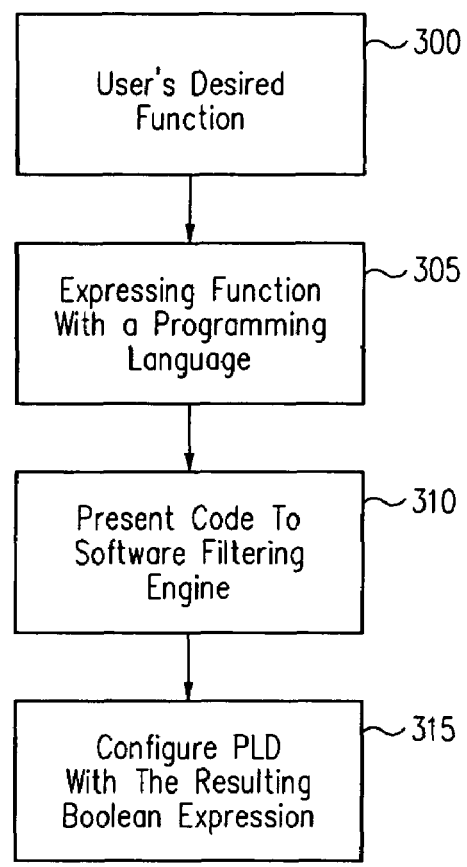
FIG. 3 illustrates a process flow for the configuration of a programmable logic device according to one embodiment of the invention.

The present invention provides algorithms for facilitating efficient product term cascading. These algorithms are implemented by a software fitting engine during configuration of programmable logic devices (PLDs). As is known in the art, a user configures a programmable logic device to perform a desired function as shown in the process flow of FIG. 3. The user must first determine what function is desired at step 300. At step 305, the user expresses the desired function using a programming language that is then transferred to a software fitting engine at step 310. The software fitting engine (implemented in a suitable processor) breaks down the programming language into a Boolean expression or function involving sums of product terms and configures the PLD accordingly at step 315. In the present invention, the software fitting engine is configured to perform the algorithms disclosed herein to facilitate product term cascading to increase logic function input width.

Figure 1:
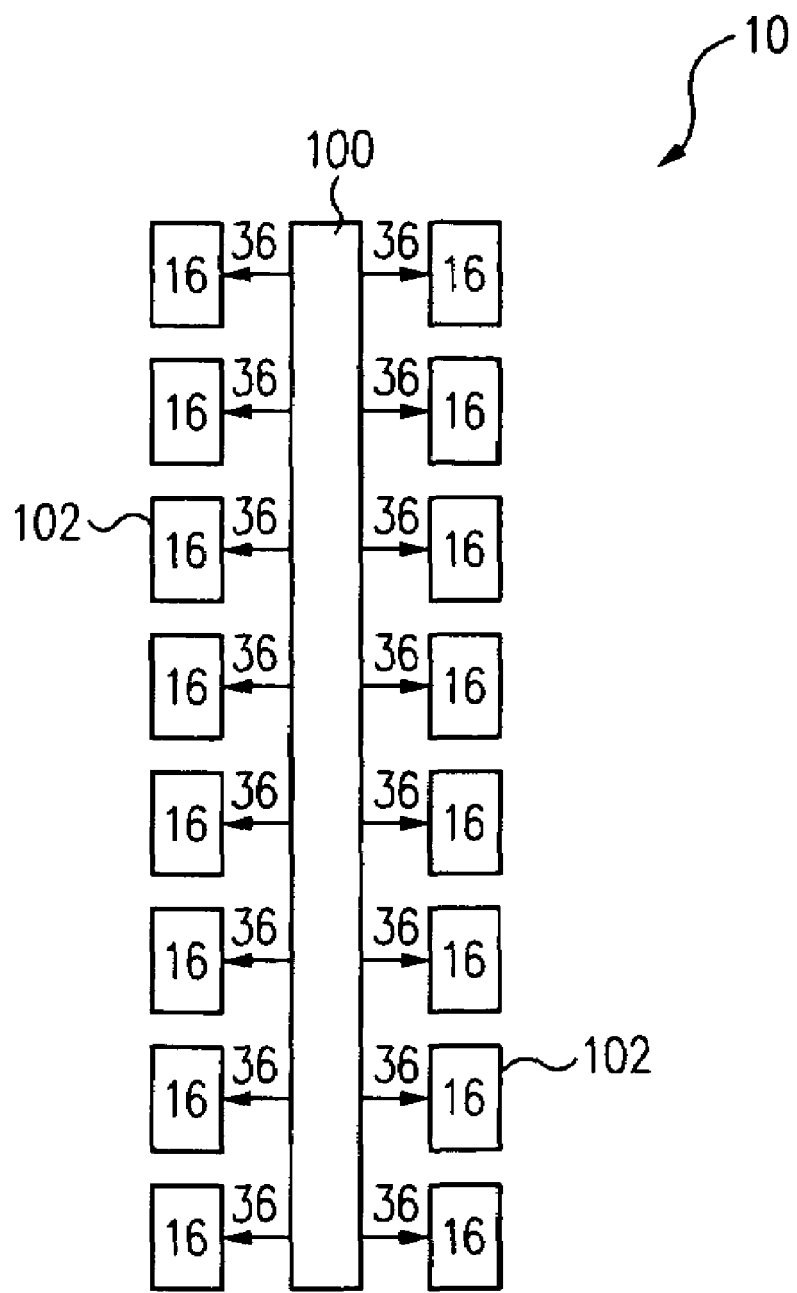
FIG. 1 is a block diagram of a conventional complex programmable logic device (CPLD).
Figure 2:
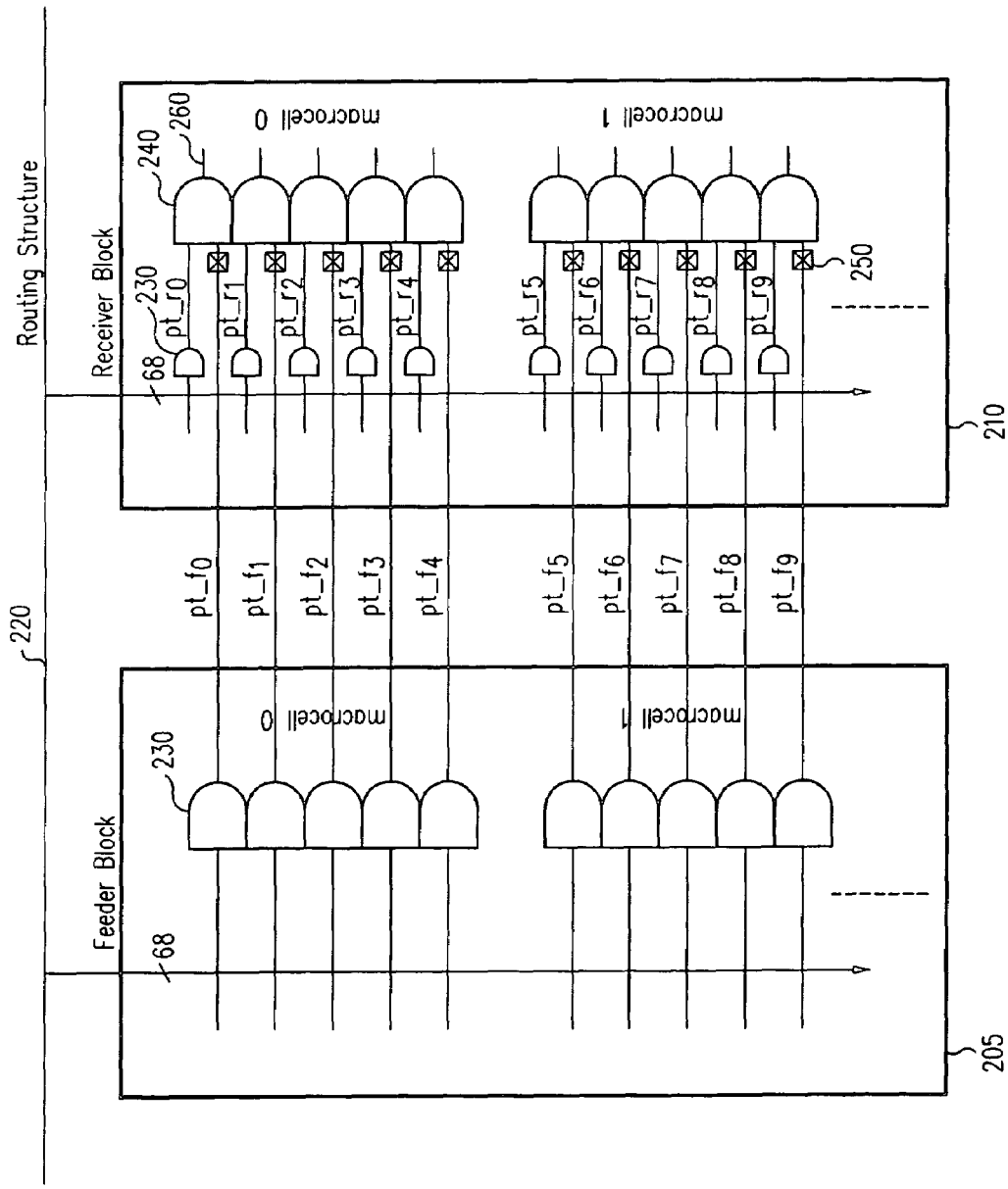
FIG. 2 is a schematic illustration of a receiver-logic block and a feeder logic block configured for product term cascading to increase input width.

The product term cascading algorithm is described herein with respect to an exemplary complex programmable logic device (CPLD) architecture having receiver and feeder logic blocks 210 and 205 as shown in FIG. 2. However, it will be appreciated that the algorithms disclosed herein are widely applicable to any suitable CPLD architecture. These algorithms address three major areas: assigning input variables, partitioning the product terms to particular logic block product term cascade segments, and placing or assigning the product terms to a particular macrocell in a given logic block. The assignment of input variables will be addressed first.

Input Variable Assignment

As discussed previously, an input variable assignment choice is presented in a programmable logic device that provides logic blocks wherein one logic block is configured to provide a product term output that may borrow input variables from corresponding product term outputs in another logic block of the device through a process denoted as product term cascading. For optimal performance, a designer may desire to have the maximum allowable number of input variables assigned to the receiver logic block to prevent wastage of product terms. On the other hand, a designer may desire to have fewer input variables assigned to the receiver logic block to prevent routing burdens. Algorithms are presented herein to provide an acceptable compromise between these two design goals.

Before addressing the specifics of these algorithms, a simplified example may provide a useful heuristic illustration of the general approach. In this example, it will be assumed that the maximum number of input variables provided by the routing structure to each logic block is five and that a user requires a logic function F that is the sum of three product terms: (1) a.b.c.!d.e.f; (2) a.b.!c.d.e; and (3) a.!b.c.d, where the exclamation point before an input variable indicates the complement of this variable is required. The total number of input variables is thus 6, which exceeds the maximum number of input variables provided by the routing structure to any given logic block. Thus, product term cascading must be performed between a feeder and a receiver logic block to produce product terms having the desired input width. A number of different input variable assignments may be used. For example, the feeder logic block may be assigned to receive the set of input variables (a, b, c, d) while the receiver logic block is assigned to receive the set of input variables (e, f). In such a split of input variables, three product terms are used in the feeder logic block and three product terms are used in the receiver logic block. Note that in the receiver logic block, even though no input is used on product term number (3), it must still be set to true so that when it is ANDed with the corresponding product term from the receiver logic block the proper product term (a.!b.c.d) is provided. Thus, the third product term produced by the receiver logic block is effectively wasted.

To avoid any product term wastage in the receiver logic block, an alternative partition may be performed such that the receiver logic block is assigned the set of variables (a, b, c, d, e) while the feeder logic block is assigned to receive input variables f. Referring back to the function F, it may be seen that the receiver logic block must provide inputs to each product term such that no product terms are left unused as with the previous example. However, the routing structure may be burdened to provide this maximum-allowable number of input variables to the receiver logic block. It follows that some type of compromise between the preceding two example partitions will provide an optimal partitioning of the input variables. For example, it may be that assigning the set of input variables (a, b, c, d) to the receiver logic block while assigning the set of input variables (e, f) to the feeder logic block provides the best compromise between avoiding both product term wasting and routing structure burdens.

A more rigorous technique (rather than trial and error) to splitting the input variables involves a hypergraph partitioning problem approach using a cost function. If the integer K represents the maximum input width provided by the routing structure to each logic block, then a logical input variable splitting between the feeder and receiver logic block may be represented by $K=k_r+k_f$, where $k_r$ is the positive integer number of input variables assigned to the receiver logic block and $k_f$ is the positive integer number of input variables assigned to the feeder logic block. During the assignment process, one goal is to minimize the number $n_f$ of product terms utilized (i.e, product term outputs from the feeder logic block in which inputs from the set $k_f$ have been fused in). But a cost function whose only goal is to minimize $n_f$ would be likely to lead to a very high $k_r$ that may cause routability problems. Thus, the cost function chosen should include a boundary penalty when either $k_r$ or $k_f$ are getting close to K. Many different cost functions may be chosen to satisfy these two goals. An example cost function C is given by:

$$C=\alpha*n_f+(k_r \leq K-\beta?0:(k_r-K-\beta))^\gamma)+(k_f \leq K-\beta?0:(k_f-(K-\beta))^\gamma)$$

where $\alpha$, $\beta$, and $\gamma$ are positive integer constants and where the notation a ? b:c is pseudocode notation for: if a, do b, else do c.

It follows that, for a given splitting between $k_r$ and $k_f$, if $k_r$ is less than or equal to the boundary quantity (K−β), then the cost function C equals just $\alpha*n_f$. This makes intuitive sense because when $k_r$ is less than the boundary quantity, the only goal should be to reduce the number of product terms $n_f$ that are provided by the feeder logic block. If, however, $k_r$ is greater than the boundary quantity (K−β) and $k_f$ is less than or equal to the boundary quantity (K−β), then the cost function C equals $\alpha*n_f+(k_r-(K-\beta))^\gamma$. In this case, the cost function value is being incremented by an exponential factor of the difference between $k_r$ and the desired minimum boundary quantity (K−β). Finally, if both $k_r$ is greater than the quantity (K−β) and $k_f$ is greater than the quantity (K−β), the cost function C equals $\alpha*n_f+(k_r-(K-\beta))^\gamma+(k_f-(K-\beta))^\gamma$. In this case, the cost function value is additionally incremented by an exponential factor of the difference between $k_f$ and the desired minimum boundary quantity (K−β).

The factors $\alpha$, $\beta$, and $\gamma$ may be varied as necessary for a given design to achieve the desired performance. For example, for a splitting of inputs between the receiver logic block 210 and feeder logic block 205, where each logic block contains 32 macrocells corresponding to five product terms each (each product term having a routing-structure-limited input width of 68 variables), the values of $\alpha=5$, $\beta=3$, and $\gamma=3$ were found satisfactory. It will be appreciated that alternative cost functions could also be formulated, keeping in mind the desired goal of minimizing the number of product terms provided by feeder logic block and providing a boundary penalty when either $k_r$ and/or $k_f$ exceeds a desired minimum boundary quantity. Given a suitable cost function C, traditional optimization algorithms may be used to solve for values of $k_r$ and $k_f$. The resulting partitioning between $k_r$ and $k_f$ is denoted herein as "optimal" in that the compromise it achieves between the competing values in the cost function is acceptable to a user. For example, a suitable optimization algorithm for each desired sum of product term function having more than K inputs is given by the following pseudocode notation:

```
C=∞
split the set of inputs in 2 balanced sets k_r and k_f.
while (C>Target) {
  let I be an input in feeder function f_f or receiver function f_r {
    if (I∈f_f) {
      move input I to receiver function f_r (thereby changing the values of k_r, k_f, and n_f)
      compute C'=new cost (using the desired cost function with the new values of k_r, k_f, and n_f)
      if (C'<C)
        C=C',
      elseif C' is greater than or equal to C
        move input I function f_f (thereby changing the values of k_r, k_f, and n_f)
    } elseif (I ∈ f_r){
      move input I to feeder function f_f (thereby changing the values of k_r, k_f, and n_f)
      compute C'=new cost (using the desired cost function with the new values of k_r, k_f, and n_f)
      if (C'<C)
        C=C',
      elseif C' is greater than or equal to C
        move input I to feeder function f_r}
}
```

With respect to the above pseudocode, it will be understood that by moving an input, from the receiver function $f_r$ to the feeder function $f_f$, $k_r$ is reduced by one input and $k_f$ is increased by one input. Similarly, by moving an input from the feeder function $f_f$ to the receiver function $f_r$, $k_f$ is reduced by one input and $k_r$ is increased by one input.

Figure 4:
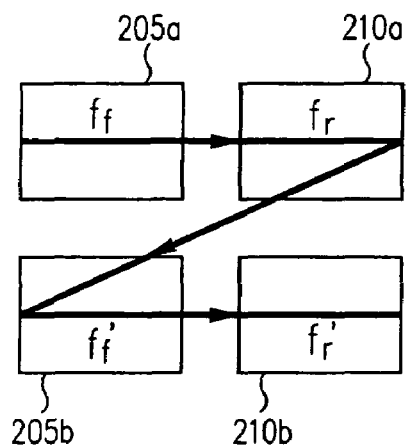
FIG. 4 illustrates a product term cascading across a segment of logic blocks.

Note that the direct product term cascading discussed with respect to FIG. 2 may be extended across a cascade chain such that a receiver logic block acts as a feeder logic block to another logic block. For example, consider the cascading product term flow shown in FIG. 4. Feeder logic block 205a and receiver logic block 210a function as discussed with respect to FIG. 2. However, a direct path is provided for each product term output from receiver logic block 210a to another feeder logic block 205b. Thus, receiver logic block 210a acts as a feeder logic block with respect to feeder logic block 205b. Feeder logic block 205b would possess a set of AND gates that function as discussed with respect to AND gates 240 of FIG. 2 to permit feeder logic block 205b to form product terms using the cascaded product terms from receiver block 210a. From feeder block 205b, the resulting product terms may then be cascaded over to receiver product term 210b to end the cascade chain. It will be appreciated that the cascaded product terms are aligned at the macrocell level as discussed with respect to FIG. 2. Depending upon the design of an individual programmable logic device, the length of the cascade chain may vary. In the embodiment illustrated in FIG. 3, the programmable logic device can support a maximum cascade chain length of four logic blocks. This maximum cascade chain length may be referred to as a segment. For a segment of N logic blocks in length, where each logic block has a routing-structure-limited input width of k variables, the maximum input width for cascaded product terms from the final receiver logic block is N*k. To achieve even wider logic functions, a cascaded product term from one segment must be routed through the routing structure to another segment. Accordingly, the software fitting engine must perform segment-level partitioning of the logic functions in such an instance.

Segment-Level Partitioning

Because cascading product terms from one segment to another increases routing burdens on the routing structure, a goal of a segment-level partitioning should be to reduce the total number of inputs from one segment to another. Reducing the number of inputs will decrease the routing burdens in the programmable logic device. In addition, having too many split functions (a split function is a product term expression having an input width that requires cascading from a feeder logic block to a receiver logic block) within any given segment may cause the number of required inputs to exceed the total number of inputs that are provided by the routing structure to the segment. Thus, another goal of the segment partitioning is to distribute the split functions as widely as possible among the segments. As with the splitting function approach described previously, a rigorous technique to satisfy these goals uses a suitable cost function. For example, if C' represents a cost function that is the mincut representing the minimum number of inputs required between segments, a suitable cost function C'' for the segment-level partitioning is:

$$C''=C'+\lambda\Sigma_i S_i^2$$

where $S_i$ is the number of split functions in the ith segment and $\lambda$ is an integer constant. It will be appreciated that many other suitable cost functions that may be used to balance the goals of minimizing inputs between segments and distributing the split functions amongst the segments as much as possible. The value of $\lambda$ will depend upon individual programmable logic device parameters—in a CPLD having segments of four logic blocks in length, where each logic block contains 32 macrocells corresponding to five product terms each (each product term having a routing-structure-limited input width of 68 variables), a value of $\lambda=100$ has provided satisfactory results. Note that such a value will cause the cost function C'' to have a significantly increased value if the split functions are not distributed amongst the segments. For example, in a situation with four split functions and four segments, suppose one possible segment-level partitioning would be to assign one split function to each segment. In that case, the value for the factor $\lambda\Sigma_i S_i^2$ would be 400. However, if all four split functions are assigned to just one segment, the value is increased to 1600. Regardless of how the cost function is formulated, traditional optimization algorithms may be used to solve for the values of $S_i$ and C'. Having split the functions and performed the segment-level partitioning, the product terms must be placed or assigned to macrocells within a logic block in a placement process.

Placement Process

The placement process is performed in the opposite direction of the cascading scheme. This is because the placement of a feeder product term depends upon the location of the corresponding receiver product term. In other words, once a receiver product term is placed, the placement of the corresponding feeder product term is also fixed. It will be appreciated that conventional placement algorithms may be used to place the receiver functions from a split function as well all non-split functions. Once the placement algorithm has placed the receiver functions in a given block, the corresponding feeder functions for the feeder block are determined or locked. The resulting placement algorithm may be summarized in pseudocode as follows:

for all the blocks, starting at the last block and proceeding in the opposite direction of the cascading scheme
  if the current block contains one or more receiver functions perform regular placement of all the functions in this block lock the locations in the next block for the feeder functions;
  elseif the current block contains one or more feeders assign the feeder(s) to the locked location(s);
  perform regular placement for the remaining functions;
  else perform regular placement The above-described embodiments of the present invention are merely meant to be illustrative and not limiting. For example, although the input variable assignment process for split functions has been described with respect to a PLD architecture in which product terms from a feeder logic block may be directly cascaded to a receiver logic block without involving the routing structure, this process is also applicable to conventional architectures in which such product term cascading must occur through the routing structure. In such a case, if the same form for the cost function C is desired, the boundary quantity (K–β) must be reduced by one for every product term cascaded through the routing structure to the receiver logic block. It will thus be obvious to those skilled in the art that various changes and modifications may be made without departing from this invention in its broader aspects. The appended claims encompass all such changes and modifications as fall within the true spirit and scope of this invention.

What is claimed is:

1. A method for assigning input variables between a feeder logic block and a receiver logic block to implement a logic function, wherein the input width of the logic function exceeds a maximum input width for both the feeder logic block and the receiver logic block, the method comprising:
providing a cost function that assigns a first cost to a number of product terms cascaded from the feeder logic block to the receiver logic block and also assigns a second cost that increases as a number of input variables assigned to the receiver logic block approaches its maximum input width; and
testing the cost function using a plurality of input variable assignments to determine an optimal input variable assignment.

2. The method of claim 1, further comprising configuring the receiver and feeder logic blocks to implement the logic function using the optimal input variable assignment.

3. The method of claim 1, wherein the cost function provided by the providing act also assigns a third cost that increases as the number of input variables assigned to the feeder logic block approaches its maximum input width.

4. The method of claim 1, wherein the first cost is an integer multiple of the number of product terms cascaded from the feeder logic block to the receiver logic block.

5. The method of claim 4, wherein the integer multiple is five.

6. The method of claim 1, wherein the second cost is an exponential function of the difference between the number of input variables assigned to the receiver logic block and its maximum input width.

7. The method of claim 6, wherein the second cost equals $(k_r-(K-\beta))^\gamma$, $k_r$ being the number of input variables assigned to the receiver logic block, the maximum input width is K, and $\beta$ and $\gamma$ are positive integers.

8. The method of claim 7, wherein $\beta$, and $\gamma$ equal three.

9. A method for partitioning a plurality of logic functions amongst segments of a programmable logic device, wherein each segment comprises a plurality of logic blocks arranged from a first logic block to a last logic block, the plurality of logic blocks being configured to support a cascade chain extending from the first logic block to the last logic block for increasing a input width of cascaded product terms, and wherein each logic block has a maximum input width, the method comprising:

identifying split functions within the logic functions whose input width exceeds the maximum input width for the logic blocks;

providing a cost function that assigns a first cost to a number of outputs provided to each segment by the remaining segments and that assigns a second cost to the number of split functions within each segment; and testing the cost function with a plurality of partitions of the logic functions amongst the segments to identify an optimal partitioning.

10. The method of claim 9, wherein the first cost is proportional to the number of inputs provided to each segment by the remaining segments.

11. The method of claim 9, wherein the second cost is an exponential function of the number of split functions within each segment.

12. The method of claim 11, wherein the second cost equals $\lambda\Sigma_i S_i^2$, wherein $S_i$ is the number of split functions in the ith segment and wherein $\lambda$ is a positive integer.

13. The method of claim 12, wherein $\lambda=100$.

14. A processor for configuring a programmable logic device to implement a desired logic function, wherein the programmable logic device includes a plurality of logic blocks, each logic block having a maximum input width, the processor comprising:

a software fitting engine operable to identify functions within the desired logic functions whose input width exceeds the maximum input width such that the identified functions must be split between a feeder logic block and a receiver logic block within the programmable logic device, the software fitting engine being further operable to provide a cost function that assigns a first cost to a number of product terms cascaded from the feeder logic block to the receiver logic block and also assigns a second cost that increases as a number of input variables assigned to the receiver logic block approaches its maximum input width, the software fitting engine being operable to test the cost function using a plurality of input variable assignments to determine an optimal input variable assignment.

* * * * *